Patented Apr. 29, 1947

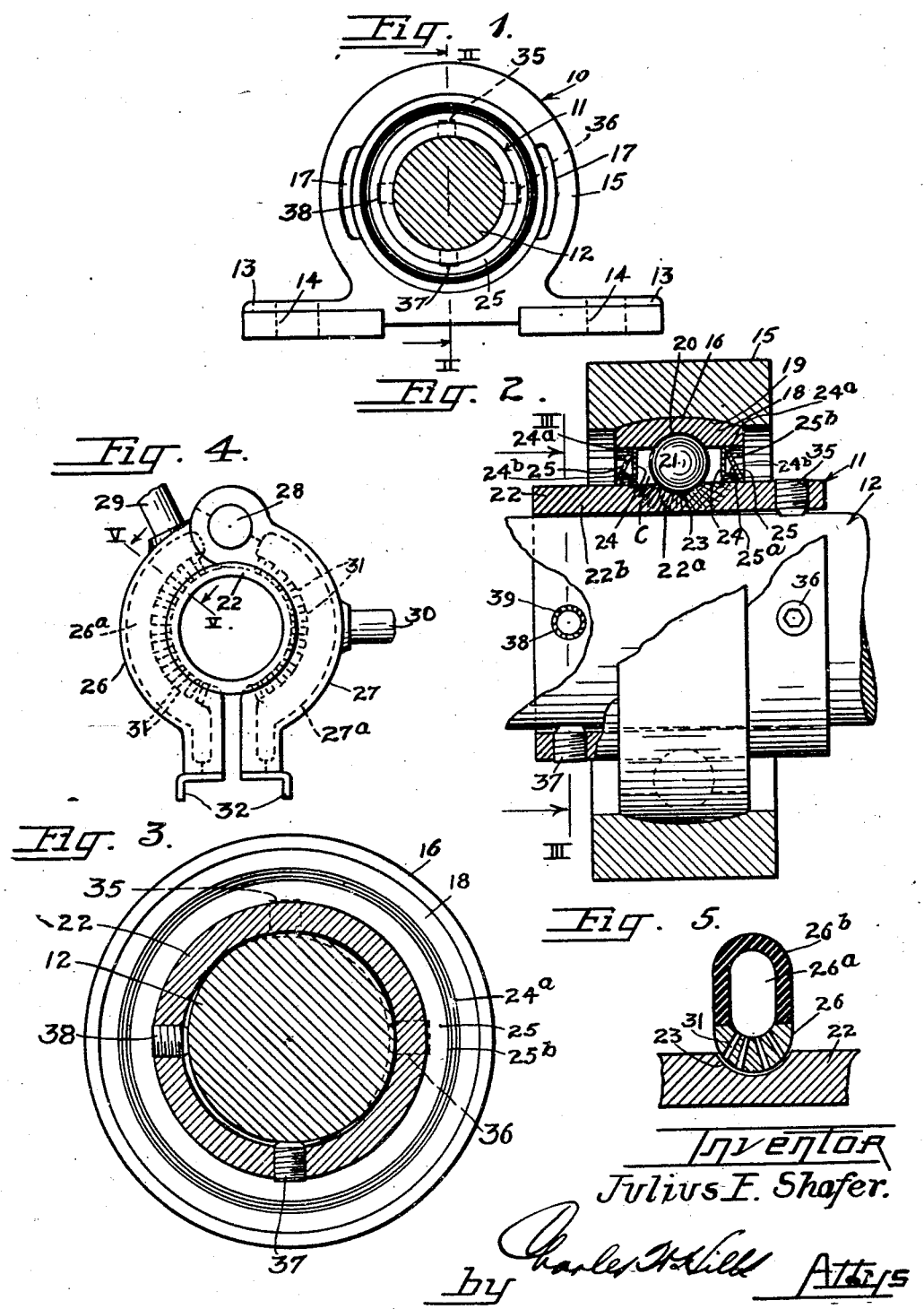

2,419,691

UNITED STATES PATENT OFFICE 2,419,691

BEARING ASSEMBLY

Julius E. Shafer, Chicago, Ill.

Application December 23, 1943, Serial No. 515,379

5 Claims. (Cl. 287—52.08)

This invention relates to bearing assemblies having improved inner race ring structure adapted to be fixedly locked on an inserted member such as a shaft.

Specifically, the invention relates to an improved inner race ring for a ball bearing assembly which ring is composed of steel that is hardened only at the ball groove portion thereof and which has unhardened outer end portions each carrying a pair of set screws in diagonally offset relation for fixedly locking an undersized member inserted in the ring to prevent relative tilting movements of the member and ring.

While the invention will be hereinafter specifically described as embodied in a sealed ball bearing unit, it should be understood that the principles of this invention are applicable to all types of bearing assemblies and to sleeve members in general which are to be locked onto inserted shafts or the like.

Heretofore, the inner race rings of bearing assemblies were locked onto inserted shafts only at one outer end of the race ring. If the shaft or inserted member was somewhat undersize, the locking means at the one end of the inner race ring would cock the shaft in the race ring or the race ring on the shaft, thereby creating clearance between the shaft and the other end of the race ring. During rotation of the shaft the cocked relationship would cause rocking of the race ring on the shaft and vibratory impacts would be set up. Since the race rings of bearings are usually composed of hardened high carbon steel, while shafts inserted in such bearings are usually composed of mild steel, the two metals have slightly different electromotive forces which are sufficient to set up a battery-like corrosive action causing oxidation or rusting of the softer metal. Ordinarily the battery-like action would be insufficient to damage the softer mild steel shaft, but the vibratory impacts pound loose the oxide film formed on the shaft and the assembly bleeds out iron rust. As a result, the shaft soon becomes badly worn and greatly undersized. Of course, as the shaft decreases in size, the vibratory impacts increase in magnitude and the whole assembly is soon unfit for use.

In accordance with the present invention bearing units are equipped with inner race rings which are extended on both sides beyond the outer race rings and carry, at each extended end or side, a pair of set screws or other locking means for gripping an inserted shaft at both ends of the race ring. It is preferred that the locking means be disposed in 90° relationship with each other so that pairs of diagonally opposed locking means are provided at each end of the race rings. Since the locking means firmly and fixedly secure the race ring to an inserted shaft and stress the inner race ring and render it less resilient, there is a greater possibility for the race ring to crack under high load. To entirely eliminate this possibility according to this invention, the inner race rings are hardened only at the ball groove portion thereof or the portion which actually forms the riding surface for the anti-friction bearing elements. To produce this local hardening, the inner race rings 15 are preferably made from high carbon high chromium steel, is subjected to a high frequency electric current treatment at the ball groove until this portion of the ring is heated sufficiently for quench hardening. The locally heated ball groove portion is then immediately quenched. As a result, the race ring has a very hard and thus brittle localized portion receiving the anti-friction elements surrounded by a softer and more resilient main body portion carrying the locking means. This main body portion provides a cushion for the hardened portion.

The preferred bearing units of this invention have seals each including a U-shaped retainer member carried by the outer race ring and a cooperating Z-shaped flinger carried by the inner race ring to effectively seal the anti-friction element chamber between the race rings.

It is, then, an object of this invention to provide a bearing assembly with an improved inner race ring structure having a hardened localized portion providing a race for the anti-friction elements and cushioned in an integral, unhardened body portion which carries locking means for fixedly securing an inserted shaft against all movements relative thereto.

A still further object of the invention is to provide improved inner race ring locking structure for bearings which eliminates rocking action between an inserted member and the race ring.

A still further object of the invention is to provide an improved shaft lock for bearing assemblies.

Another object of the invention is to provide an improved bearing unit having a race ring structure with a localized hardened portion for directly receiving anti-friction elements thereon which portion is embedded in a softer resilient integral part carrying set screws at both ends thereof for locking an inserted member.

A specific object of the invention is to provide a race ring for ball bearings which has a hardened ball groove cushioned in an integral unhardened ring structure.

Another object of the invention is to provide an improved shaft lock for bearing assemblies wherein pairs of diagonally arranged set screws act on the shaft in planes which are offset 90° to secure the shaft against rocking.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view of a bearing assembly according to this invention illustrating a sealed bearing unit mounted in a one-piece pillow block.

Figure 2 is an enlarged vertical cross-sectional view taken substantially along the line II—II of Figure 1.

Figure 3 is a transverse vertical cross-sectional view taken along the line III—III of Figure 2.

Figure 4 is a side elevational view of mechanism for locally hardening the ball groove portion of the inner race ring of this invention.

Figure 5 is a cross-sectional view taken along the line V—V of Figure 4.

As shown on the drawings:

In Figure 1, the reference numeral 10 designates generally a one-piece pillow block having a sealed bearing unit 11 mounted therein with the bearing unit 11 fixedly united to a shaft 12.

The pillow block 10 has feet 13—13 thereon with holes or slots 14—14 therethrough for receiving bolts (not shown) for rigidly mounting the pillow block in position. An annular strap portion 15 is provided intermediate the feet 13—13 and this strap portion 15 has a concave segmental spherical inner face or bearing wall 16 as best shown in Figure 2.

As shown in Figure 1, slots or grooves 17—17 are formed on diametrically opposite sides of the strap portion 15 through the inner bearing wall thereof to receive the sealed bearing unit 11 therein when the unit is in a horizontal position. The unit 11, when thus inserted in the slots 17—17, can be tilted 90° into vertical position to be seated on and tiltably retained by the bearing wall 16 of the strap.

As best shown in Figure 2, the sealed bearing unit 11 includes an outer race ring 18 with a convex segmental spherical outer bearing wall 19 seating on the concave bearing wall 16 of the strap 15. An annular groove 20 is formed in the ring 18 to provide an outer race for ball bearings 21.

An inner race ring 22 is nested within the outer race ring 18 but extends on both sides beyond the outer race ring. This inner race ring 22 has a groove 23 around the circumference thereof to provide an inner race for the ball bearings 21.

The outer race ring 18 can tilt in the strap 15 of the pillow block and the inner race ring 22 can rotate on the balls 21 relative to the outer race ring 18. To provide a sealed ball chamber C between the race rings 18 and 22 for the balls 21 a channel-shaped or U-shaped retainer 24 is press-fitted into the outer race ring 18 at opposed ends of this outer race ring. This channel strip 24 has a vertical web portion with an outturned flat peripheral circumferential flange 24a press-fitted into the race ring 18 and a flat inner peripheral flange 24b in spaced relation from the inner race ring 22. A Z-shaped flinger 25 is press-fitted onto the inner race ring adjacent each retainer 24. The flinger 25 has an inner peripheral base portion 25a pressed onto the inner race ring 22, a web portion sloping radially outward and axially inward, and a circumferential flange portion 25b extending outwardly from the radial outer end of the sloping web portion. The flinger, being press-fitted onto the inner race ring 22, rotates with this inner race ring in close-running clearance with the flanges 24a and 24b of the retainer. The chamber C is thus effectively sealed against egress of lubricant and ingress of dirt.

In accordance with this invention the grooved portion 23 of the inner race ring 22 is locally hardened to provide a very hard, wear-resisting race for the balls 21. At the same time, however, the hardened ball race is cushioned in and integral with an unhardened softer and more resilient main body portion of the ring.

The race ring 22 is preferably composed of 52100 S. A. E. high carbon high chrome steel of about the following analysis:

|  | Percent |
| --- | --- |
| Carbon | .95 to 1.1 |
| Manganese | .2 to .5 |
| Phosphorus | .03 |
| Sulphur | .035 |
| Chromium | 1.2 to 1.5 |
| Iron | Balance |

As shown in Figures 4 and 5, the inner race ring 22 has the grooved portion 23 thereof surrounded in closely spaced relation by a pair of inductors 26 and 27 hingedly connected as at 28. The inductors 26 and 27 have annular hollow chambers 26a and 27a respectively therein receiving coolant from pipes 29 and 30 respectively. The inner wall of each inductor 26 and 27 has a series of perforations 31 therethrough connecting the chamber thereof with the groove 23 of the ring 22.

High frequency low voltage electric current is supplied to the inductors 26 and 27 by means of conductors 32. In order to confine all of the current to the inner perforated walls of the inductors 26 and 27, these inductors can have outer walls composed of insulating material as indicated at 26b in Figure 5.

The current passing through the inductors 26 and 27 which inductors, as indicated in Figure 5, extend into the groove 23 and are closely spaced from the wall of the groove, induces in the surface of the metal ring 22 eddy currents of an intense nature. Since the ring 22 is made of magnetic material, considerable electric energy is dissipated in heat in the ring by hysteresis effect. The combination of the hysteresis and eddy currents rapidly heats the ring 22 adjacent the surface of the groove 23 to the point of decalescence. At this temperature the hysteresis effect becomes negligible and further heating is by the eddy currents.

The ring 22 is preferably rotated or oscillated in the inductors 26 and 27 to distribute the heat and, as soon as the ring has been heated sufficiently, quenching fluids such as water, caustic hydroxide solution, oil or the like is forced through the pipes 29 and 30 into the chambers 26a and 27a for ejection through the perforations 31 against the groove 23 of the ring 22 for immediately quenching this localized heated portion of the ring 22.

As a result, a hard, localized area 22a is provided in the race ring 22 around the groove 23. This hard portion extends radially from the groove-defining wall as indicated by the wavy lines in Figure 2 and, if desired, can extend completely through the race ring 22, or to any desired depth in the race ring. This hardened portion 22a, however, is surrounded by and embedded in the integral main body portion 22b of the ring which is unhardened, less brittle, and more resilient than the portion 22a.

In accordance with this invention the outer end portions of the inner race ring 22 each have two radially extending internally threaded holes therethrough spaced 90° apart. The holes in one end of the race ring are disposed in diagonal relation with the holes in the other end of the race ring so that two pairs of diagonally disposed holes in 90° offset planes are provided. As shown in Figures 2 and 3, the holes in one end of the race ring receive, in threaded relation therein, socket head-type set screws 35 and 36, while the holes in the other end of the race ring receive similar set screws 37 and 38. The set screws 35 and 37 form one diagonal pair which are disposed in a vertical plane as shown, while the set screws 36 and 38 form the other diagonal pair disposed in a horizontal plane, as shown. The set screws preferably have toothed rims 39 as shown on the set screw 38 of Figure 2, for biting into the shaft 12 inserted in the race ring 22.

If the shaft 12 is loose in the race ring 22, the set screws will actually cock the race ring relative to the shaft but, being disposed at both ends of the race ring, they will maintain the cocked relationship and will not permit relative rocking between the race ring and shaft. As a result, the vibratory impacts heretofore encountered are entirely eliminated and no rust bleeding occurs. Thus, while the set screw 35 forces the shaft 12 tightly against the bottom of the race ring 22 as shown in Figure 2, thereby tending to tilt the race ring on the shaft, the diagonally arranged set screw 37 will fix the other end of the race ring in this tilted relation. The diagonally arranged pair of set screws 36 and 39 in the horizontal plane likewise locks the race ring in tilted relation as shown in Figure 3.

The set screws can be securely tightened on the shaft and may highly stress the race ring 22 without danger of cracking the ring because of the resilient main body portion 22b thereof. At the same time the hard portion 22a thereof effectively resists wear and provides a very hard race for the ball elements 21.

In view of the above descriptions it will be apparent that the invention now provides an improved bearing assembly having a shaft lock eliminating all rocking movements between locked parts and capable of resisting high stress loads and wear.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a bearing assembly having a unitary inner race ring adapted to receive a shaft therethrough, the improvements of a first pair of set screws in 90° relation threaded through one end portion of the ring, and a second pair of set screws in 90° relation threaded through the other end portion of the ring, said first and second pairs of set screws being arranged relative to each other so that a set screw on one end of the ring has a cooperating set screw in diametrically opposed relation thereto on the other end portion of the ring and said set screws cooperating to fixedly lock the inner race ring onto an inserted shaft.

2. In a bearing assembly having a unitary inner race ring adapted to receive a shaft therethrough, the improvements of a first pair of set screws in 90° relation threaded through one end portion of the ring, and a second pair of set screws in 90° relation threaded through the other end portion of the ring, one set screw at one end portion of the ring being arranged relative to a set screw at the other end portion of the ring for acting on the shaft to tilt the ring relative to the shaft for locking the ring in fixed relation on the shaft.

3. In a bearing assembly having a unitary inner race ring adapted to receive a shaft therethrough, the improvements of a first pair of set screws threaded through one end portion of the ring, and a second pair of set screws threaded through the other end portion of the ring, at least one set screw at one end of the ring being arranged in diagonal relation to a set screw at the other end portion of the ring to cooperate therewith for cocking the ring relative to the shaft in fixed relation on the shaft.

4. In a bearing assembly having a one-piece inner race ring receiving a shaft freely therethrough, the improvement of a shaft lock comprising set screws threaded through said inner race ring at opposite ends thereof, said set screws in said opposite ends being in circumferentially offset relationship to each other for acting on said shaft to tilt the race ring relative to the shaft and secure said race ring in fixed tilted relation.

5. In a bearing assembly including an outer race ring and a one-piece inner race ring projecting through the outer race ring and extending outwardly from both sides of the outer race ring, the improvement of locking screws threaded through the extended end portions of said inner race ring for engaging a shaft inserted through the inner race ring, a locking screw in one end of said race ring being circumferentially offset from a locking screw in the opposite end of said inner race ring for locking the ring in fixed tilted relation on the inserted shaft.

JULIUS E. SHAFER.

REFERENCES CITED

The following references are of record in the file of this patent:

UNITED STATES PATENTS

| Number | Name | Date |
|---|---|---|
| 2,145,864 | Denneen | Feb. 7, 1939 |
| 2,259,325 | Robinson | Oct. 14, 1941 |
| 1,821,877 | Bowne | Sept. 1, 1931 |
| 2,227,617 | Yardley | Jan. 7, 1941 |
| 1,326,892 | Reynolds | Dec. 30, 1919 |